United States Patent
Ramanath et al.

(10) Patent No.: US 7,893,945 B2
(45) Date of Patent: Feb. 22, 2011

(54) COLOR MAPPING TECHNIQUES FOR COLOR IMAGING DEVICES

(75) Inventors: Rajeev Ramanath, Plano, TX (US); Gregory S. Pettitt, Farmersville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 691 days.

(21) Appl. No.: 11/466,102

(22) Filed: Aug. 21, 2006

(65) Prior Publication Data

US 2008/0043260 A1 Feb. 21, 2008

(51) Int. Cl.
*G09G 5/02* (2006.01)

(52) U.S. Cl. ............... 345/590; 345/589; 345/591; 345/601; 382/166; 382/167

(58) Field of Classification Search ............ None
See application file for complete search history.

(56) References Cited

U.S. PATENT DOCUMENTS

| | | | | |
|---|---|---|---|---|
| 5,574,666 A | * | 11/1996 | Ruetz et al. | 358/1.1 |
| 6,128,022 A | * | 10/2000 | Dillinger | 345/591 |
| 7,538,774 B2 | * | 5/2009 | Kunita et al. | 345/589 |
| 2005/0248785 A1 | * | 11/2005 | Henley et al. | 358/1.9 |
| 2005/0249407 A1 | * | 11/2005 | Tin | 382/167 |
| 2006/0170938 A1 | * | 8/2006 | Ibarluzea et al. | 358/1.9 |

* cited by examiner

*Primary Examiner*—Antonio A Caschera
(74) *Attorney, Agent, or Firm*—Charles A. Brill; Wade James Brady, III; Frederick J. Telecky, Jr.

(57) ABSTRACT

Disclosed embodiments relate to techniques for color gamut mapping when an input signal transmitting color visual images has a different color gamut than does the output display device. Polynomial rubber-sheet mapping may be used to translate the input color gamut to the output color gamut on a hue-by-hue basis within a three-dimensional perceptual color space. Also, a memory color look-up table may be used to preserve memory colors in the input gamut which are capable of reproduction within the output gamut. By using such techniques alone or in combination, it may be possible to more effectively map an input color gamut to a different output color gamut with improved calorimetric accuracy.

8 Claims, 9 Drawing Sheets

COLOR MAPPING TECHNIQUES FOR COLOR IMAGING DEVICES

FIELD OF THE INVENTION

The disclosed embodiments relate generally to techniques for color mapping one color gamut to another color gamut, specifically the type of mapping typically used when the color gamut of a visual display device does not match the color gamut of an input signal with information regarding a visual image to be reproduced.

BACKGROUND OF THE INVENTION

"Color gamut" is a term used to describe the range of colors available in a particular system. Different types of display systems tend to each have their own specific color gamut, depending upon their technological limits. Oftentimes, in visual display systems (such as digital micromirror devices, plasma displays, or LCDs, used as video displays, computer screens, or projectors, for example) the input or source color gamut differs from the output or display color gamut. This may be the case if, for example, the input signal was recorded based on a standard Rec. 709-based monitor (source device), while the actual display device (target device) used to reproduce the visual images associated with the input signal is a digital micromirror device (DMD)-based projection display system with a potentially different color gamut. As a result, some of the recorded colors from the input signal may not be reproducible within the target color gamut. Likewise, the target color gamut may allow access to a range of colors not available with the source gamut, providing the ability to more faithfully reproduce the original image.

By way of example, the target display device may have the ability to reproduce a wider array of colors than the source device. In such an instance, the target device could simply reproduce the images associated with the input signal precisely as the source might, but this would mean that the target device would not be using its full capabilities; much of the target's expanded color range would be wasted. In such an instance, the target would be capable of reproducing the visual image much more fully if it were allowed to utilize its expanded color gamut. By effectively mapping the more limited source gamut onto the target color gamut, more accurate color reproductions may be possible. If on the other hand, the input signal from the source device has a larger color gamut than does the target device, then the target display device would be incapable of recreating the visual image precisely in accordance with the input signal of the source device. In such instances, it may be useful to be able to map the source device's color gamut onto the target device's color gamut, in a way that provides as accurate a reproduction of the visual image as is possible given the constraints of the device.

With all of the different display choices currently available (each having a different, unique color gamut), the ability to effectively map from one color gamut to another is increasingly important. Only by using an effective color mapping technique can visual images be faithfully reproduced in a way that provides a realistic and pleasing image. Furthermore, an effective color mapping scheme may allow for the full color gamut of a display device to be utilized in reproducing images. This allows display technology to be maximized, taking full advantage of the available color gamut.

Conventional mapping systems consider color gamuts within a non-perceptual x-y chromaticity space, such as the exemplary space illustrated by the x-y chromaticity diagram shown in FIG. 1. This type of color space ignores luminance in its computations explicitly (although it may be included implicitly), mapping the color gamut in terms of two color spectra. The color gamut of human perception is shown as an horse-shoe-shaped figure on the x-y chromaticity diagram. The color gamut of any display device that utilizes three primary colors to reproduce a range of colors (in the manner of a CRT for example) may be represented as a triangle within the horse-shoe-shaped figure. The actual colors that any such display device can reproduce are less than the entire scope of perceptible colors, and the color gamut of the display device may be illustrated as the space within the triangle.

Mapping from one color gamut to another within the x-y chromaticity space is limited by its very nature to a linear or piecewise-linear projection due to the linearity of the XYZ color space. Linear or piecewise-linear mapping between color gamuts may be restrictive, preventing effective color mapping that achieves calorimetric accuracy. By way of example, linear mapping tends to compress "core" colors (which are the achromatic or memory colors) distorting their rendition. FIG. 2 provides an illustrative example of the type of mapping conventionally performed within the x-y chromaticity space. The three end points of the input triangle (color gamut) would be linearly mapped onto the end points of the output color gamut, with any other points within the triangular color gamut linearly following that mapping. In other words, each point within the input color gamut would be stretched in a linear (or piece-wise linear) fashion, thereby projecting onto the nearest approximation within the output color gamut. While this type of linear color mapping may be adequate if color gamuts within the x-y chromaticity space are sufficiently similar, linear mapping is often not particularly effective, possibly distorting colors so that the image colors are not reproduced particularly faithfully. The goal is to preserve calorimetric accuracy, and linear mapping may not be able to achieve this result given its constraints.

In addition, such a conventional linear mapping system may not effectively preserve memory colors. Memory colors are specific colors that are particularly important to a viewer's perception of reality. Any distortion of a memory color perceived by a viewer tends to drastically reduce the believability of the reproduced image. Examples of memory colors might be the colors associated with the blue of a clear sky, the green of grass, or assorted flesh tones of people's skin. These are real-world colors, and human beings have an innate feeling for what these colors should look like. Whenever a display device does not accurately reproduce such memory colors, the image tends to be viewed as unrealistic. Conventional color mapping systems may not effectively maintain or reproduce such memory colors, resulting in a less effective image.

SUMMARY OF THE INVENTION

There is a need for a superior color mapping technique, that produces a better color image when mapping from one color gamut to another. The disclosed embodiments utilize a three-dimensional perceptual color space representing hue, lightness, and chroma, which preserves luminance relationships and allows for non-linear mapping solutions. Typically, the disclosed techniques operate on hue slices of the perceptual color space, since it is desirable to ensure constant hue mapping.

Disclosed embodiments may utilize rubber-sheet polynomial mapping to map color points from the input color gamut to the output color gamut. By employing polynomial mapping (rather than conventional linear mapping), additional terms may be introduced, providing additional control points that allow for generation of a better fit. The higher order terms allow for better mapping, producing a better fit since additional information (besides the extreme points of the color gamut) may be factored into the mapping. In particular, such polynomial mapping provides a better fit when one or more of the color gamuts is irregularly shaped (such as having concavity), or when it is desirable to preserve certain colors (such as the achromatic colors).

Such polynomial mapping generally takes place on a hue-by-hue basis, maintaining hue. By adding terms to the equation defining the polynomial, the polynomial can be improved to provide a better fit. A least-squares technique may be employed in conjunction with selected control points to develop an effective polynomial equation for rubber-sheet mapping of points within the input color gamut to the output color gamut.

Disclosed embodiments may also make use of a memory color look-up table. Such a technique would faithfully reproduce any memory colors that are located within both the color gamuts, so that there would be no unintended distortion of these important memory colors during the color mapping process. Typically, disclosed embodiments use a weighting system based on the probability that a particular color in the input color gamut is a memory color, in order to smooth out transitions while preserving memory colors effectively.

Embodiments may utilize either polynomial rubber-sheet mapping or a memory color look-up table independently to improve the calorimetric accuracy when mapping from one color gamut to another color gamut, or they may use both of these techniques together. By using a memory color look-up table in conjunction with polynomial mapping, accurate image reproduction may be possible without the need for too many additional terms. Thus, a memory color look-up table may operate to simplify the polynomial used for the rubber-sheet mapping technique while providing for accurate mapping.

BRIEF DESCRIPTION OF THE DRAWINGS

Reference is made to the following figures, in which disclosed embodiments are illustrated by way of example, with like reference numbers referring to similar elements.

DETAILED DESCRIPTION OF EMBODIMENTS

Figure 1:
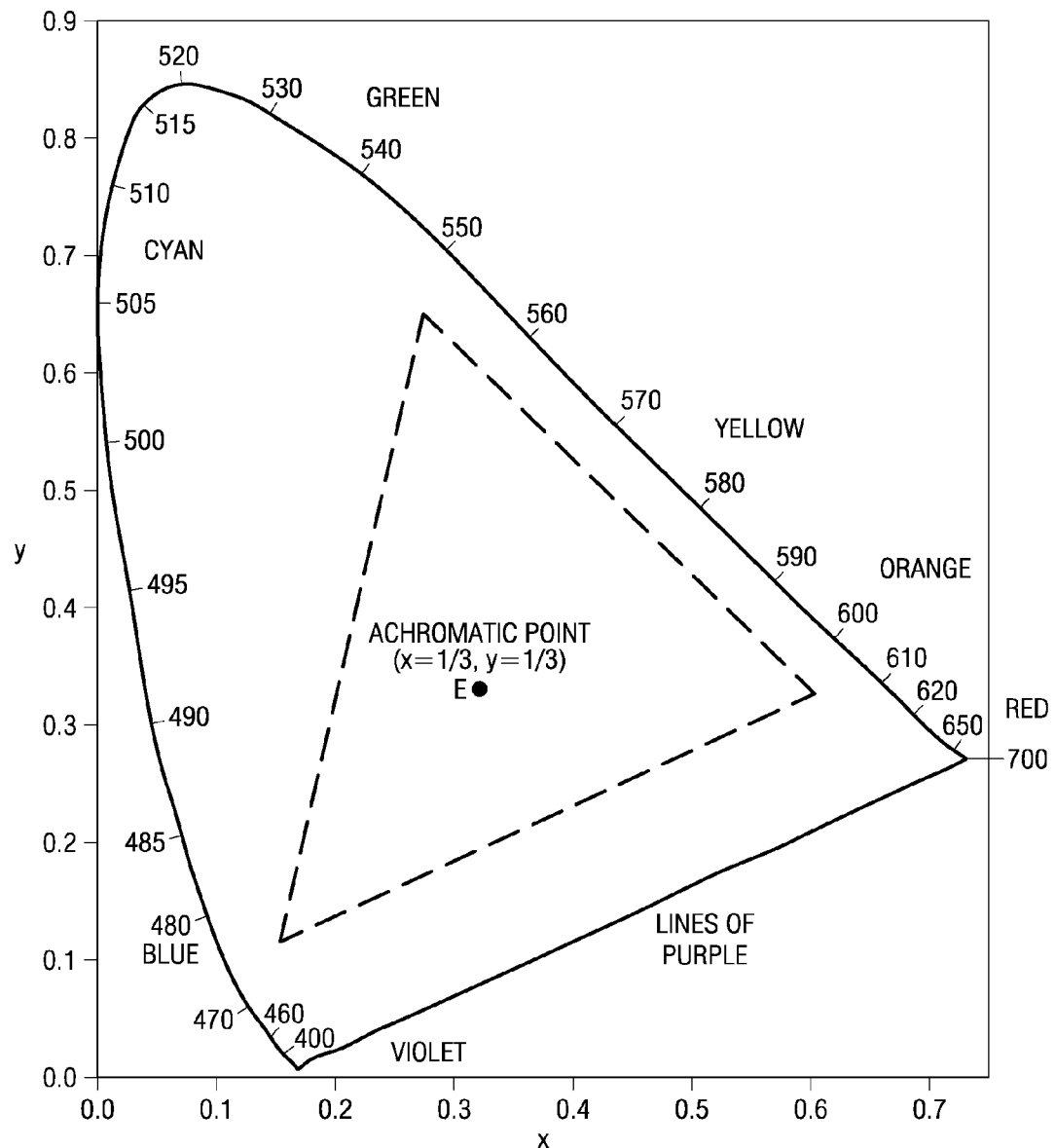
FIG. 1 illustrates an exemplary x-y chromaticity space diagram, showing the type of non-perceptual color space typically used for conventional linear gamut mapping.
Figure 2:
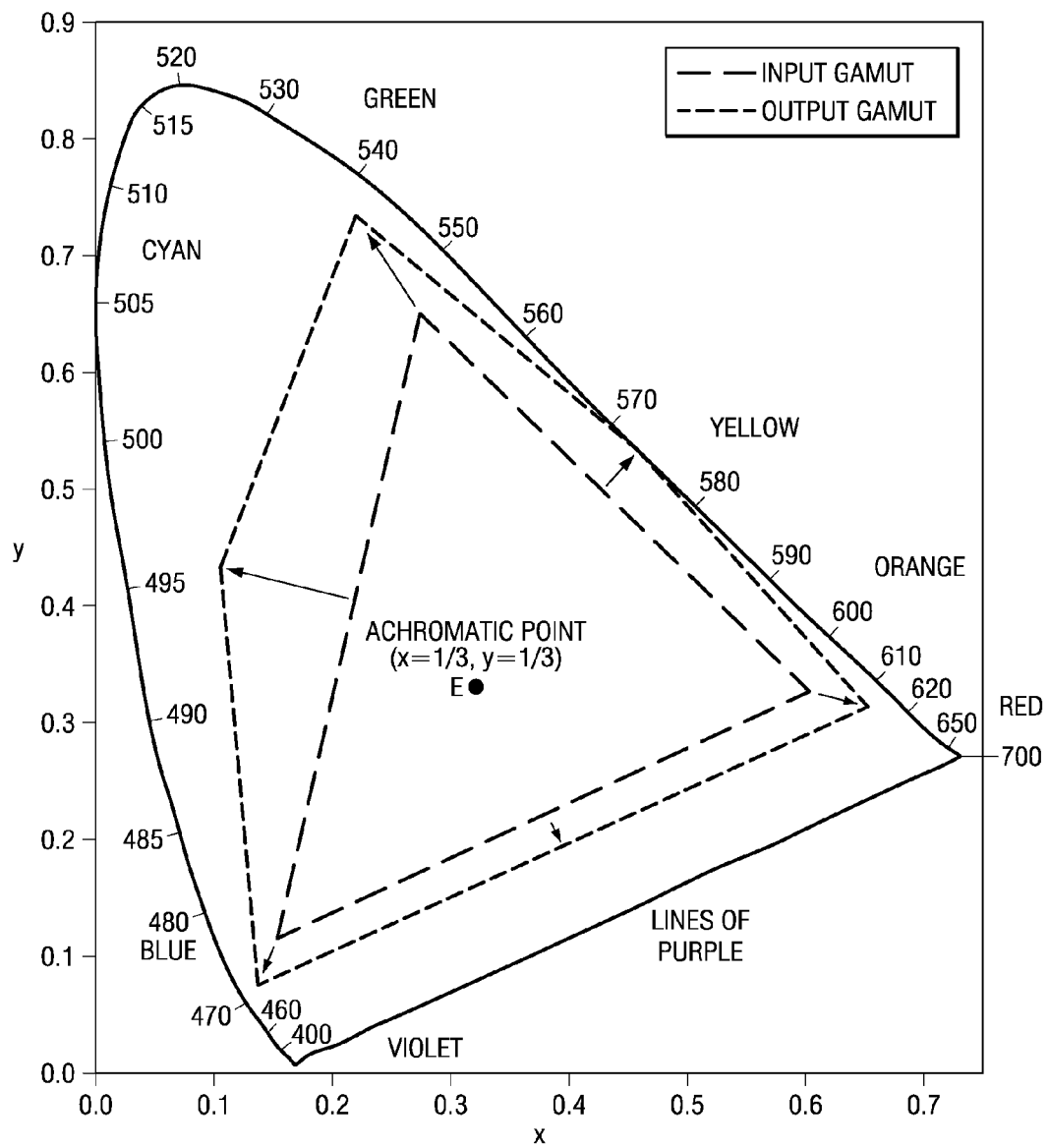
FIG. 2 illustrates the linear manner in which conventional gamut mapping is performed within an x-y chromaticity space.
Figure 3:
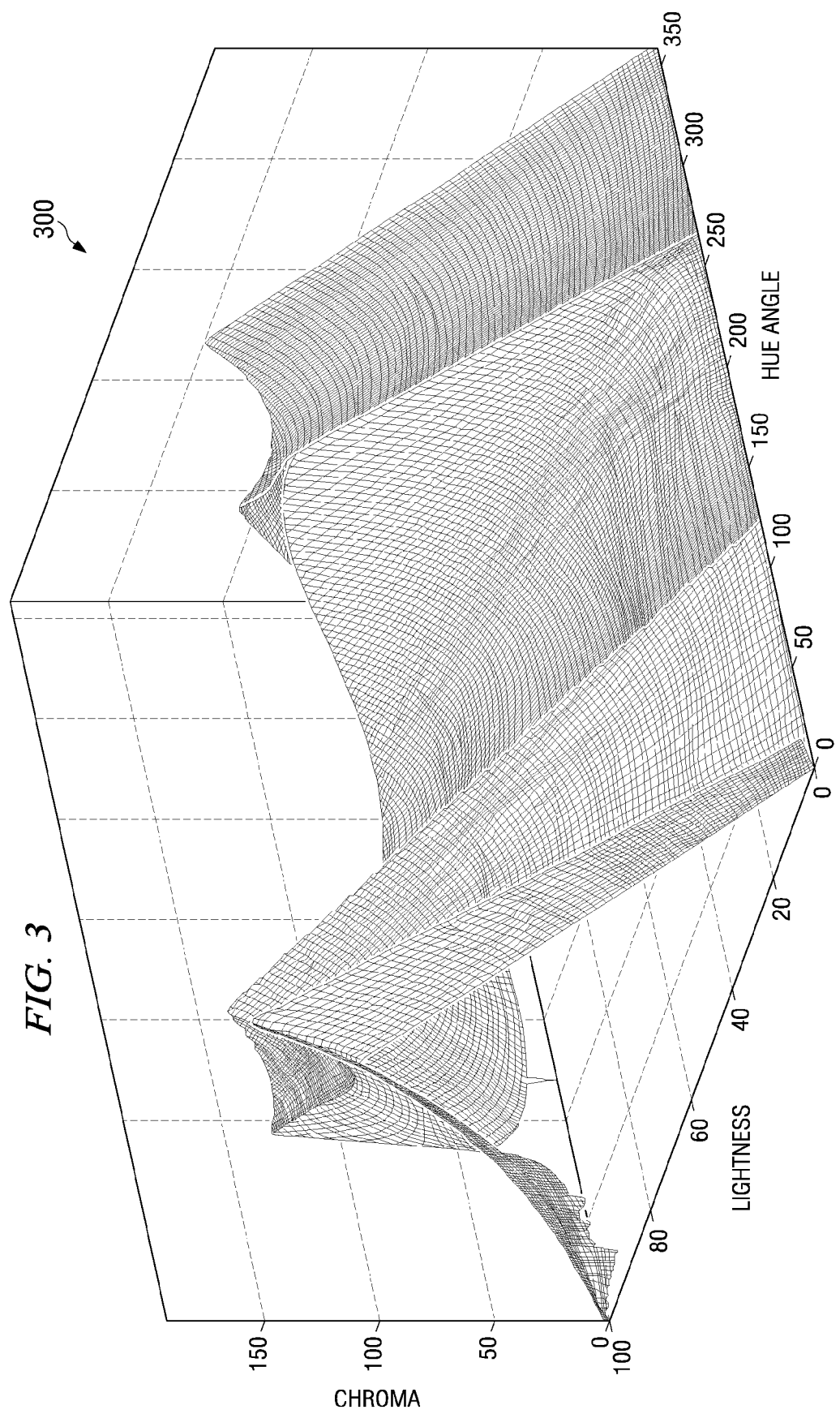
FIG. 3 illustrates an exemplary input color gamut using a perspective view of a raised relief map, showing the relationship between hue, lightness, and chroma in a perceptual three-dimensional color space.
Figure 4A:
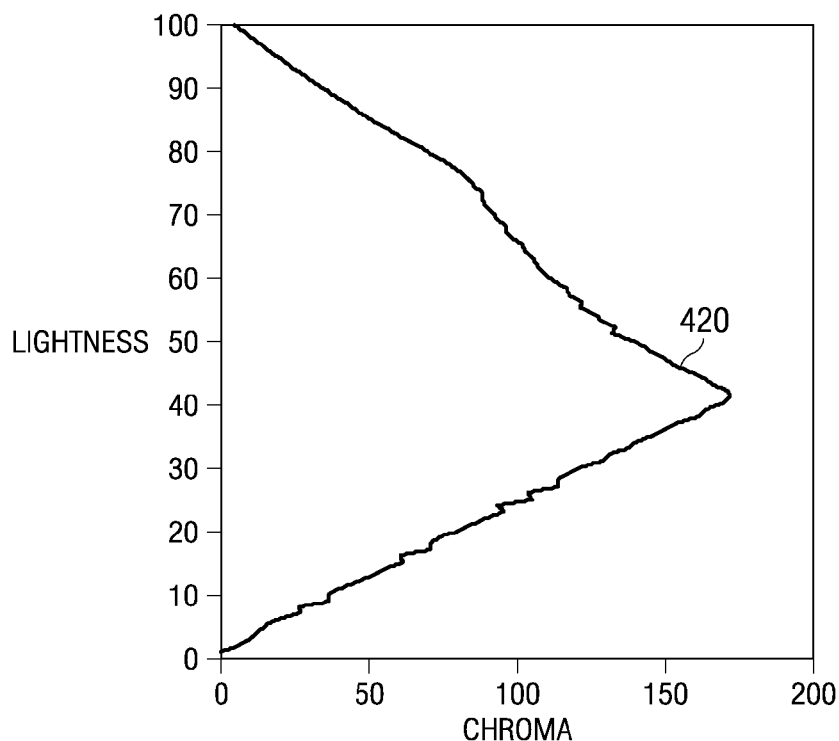
FIG. 4A is a chart illustrating an exemplary hue slice from the 3-D output gamut map (shown in FIG. 4), graphing lightness and chroma within the output color gamut for the same specific hue angle used for FIG. 3A.
Figure 4:
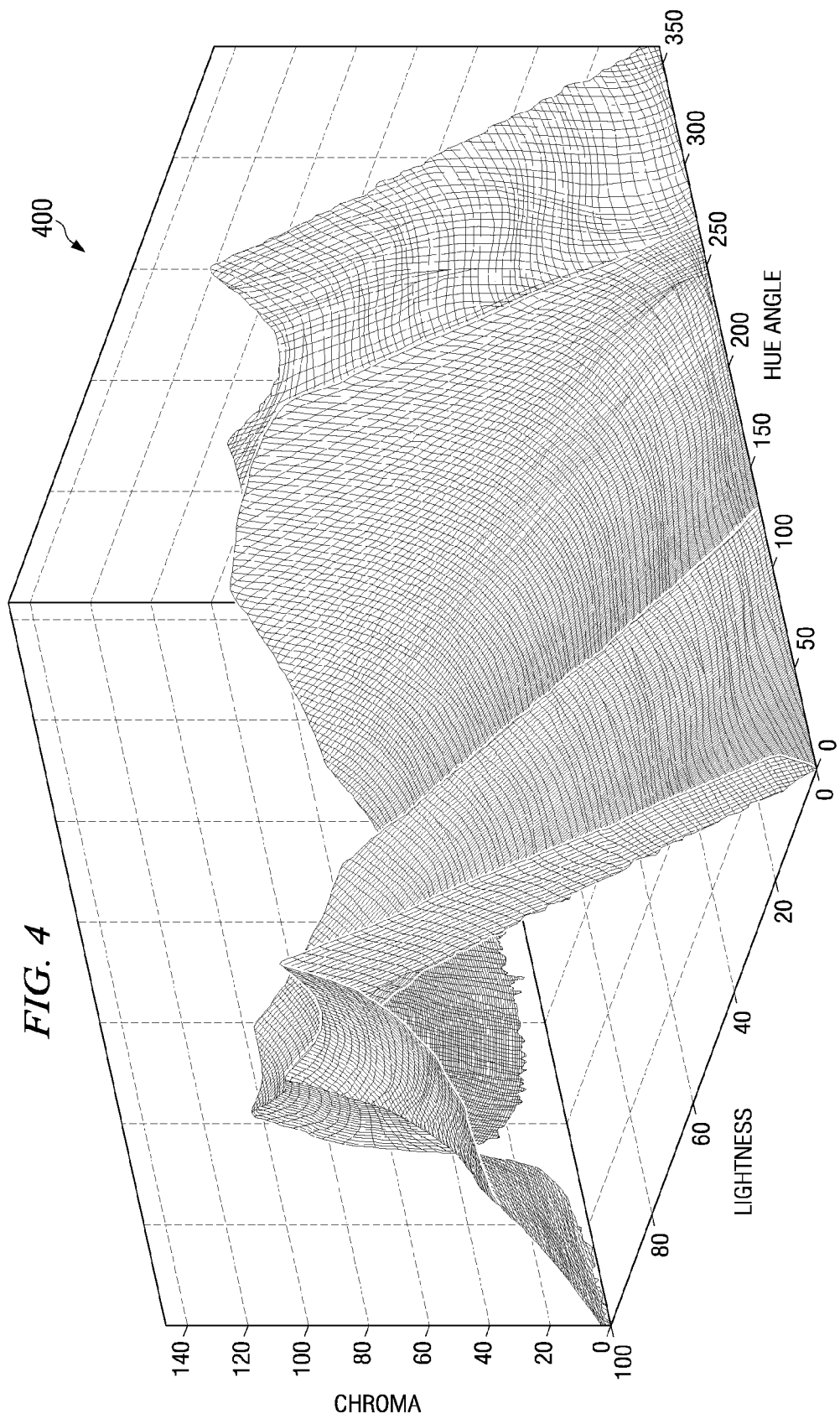
FIG. 4 illustrates an exemplary output color gamut using a perspective view of a raised relief map, showing the relationship between hue, lightness, and chroma in a perceptual three-dimensional color space.

The disclosed embodiments generally employ a three dimensional perceptual color space to model color gamuts. Examples of such perceptual color spaces would be CIELUV and CIELAB, which represent colors in a more uniform manner. Perceptual color spaces represent color gamuts using three distinct axes: hue, lightness, and chroma. Thus, any color gamut in a perceptual color space may be represented graphically as a 3-D raised relief map, showing the relationship between hue, lightness, and chroma. By way of example, FIG. 3 illustrates an exemplary input color gamut 300 as a raised relief map, while FIG. 4 illustrates an exemplary output color gamut 400 as a raised relief map. As has been discussed above, the input 300 and output 400 color gamuts often differ, as may be seen by comparing the raised relief maps of the input 300 and output 400 color gamuts shown in FIG. 3 and FIG. 4.

Figure 3A:
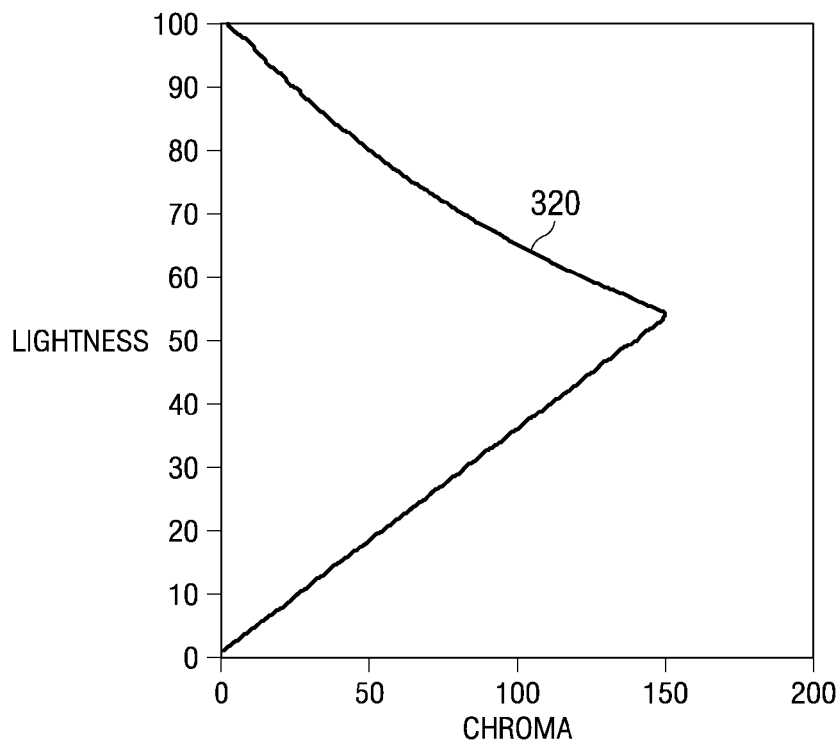
FIG. 3A is a chart illustrating an exemplary hue slice from the 3-D input gamut map (shown in FIG. 3), graphing lightness and chroma for a particular, constant hue angle within the input color gamut.

It is often desirable to maintain hue when mapping an input color gamut to a different output color gamut to avoid color shifts between the source and target color gamuts that could result in improper color renditions. Accordingly, the mapping process may be performed on a hue-by-hue basis by mapping corresponding hue slices (of which there are 360) from the input color gamut 300 to the output color gamut 400. By way of example, FIG. 3A illustrates an exemplary hue slice 320, showing the variation between chroma and lightness for a particular, constant hue angle within the input color gamut 300. Such a hue slice 320 indicates the relationship between chroma and lightness for a particular hue, and may be plotted as shown in FIG. 3A. Likewise, FIG. 4A illustrates a corresponding exemplary hue slice 420 from the output color gamut 400 (with the constant hue angle matching that selected for the hue slice shown in FIG. 3A). In the example shown in FIGS. 3 and 4, the input color gamut 300 and the output color gamut 400 for these corresponding hue slices 320, 420 differ, as shown more clearly in FIGS. 3A and 4A. By plotting two such corresponding hue slices together, the differing scope of the hue slices 320, 420 becomes more apparent.

Figure 5:
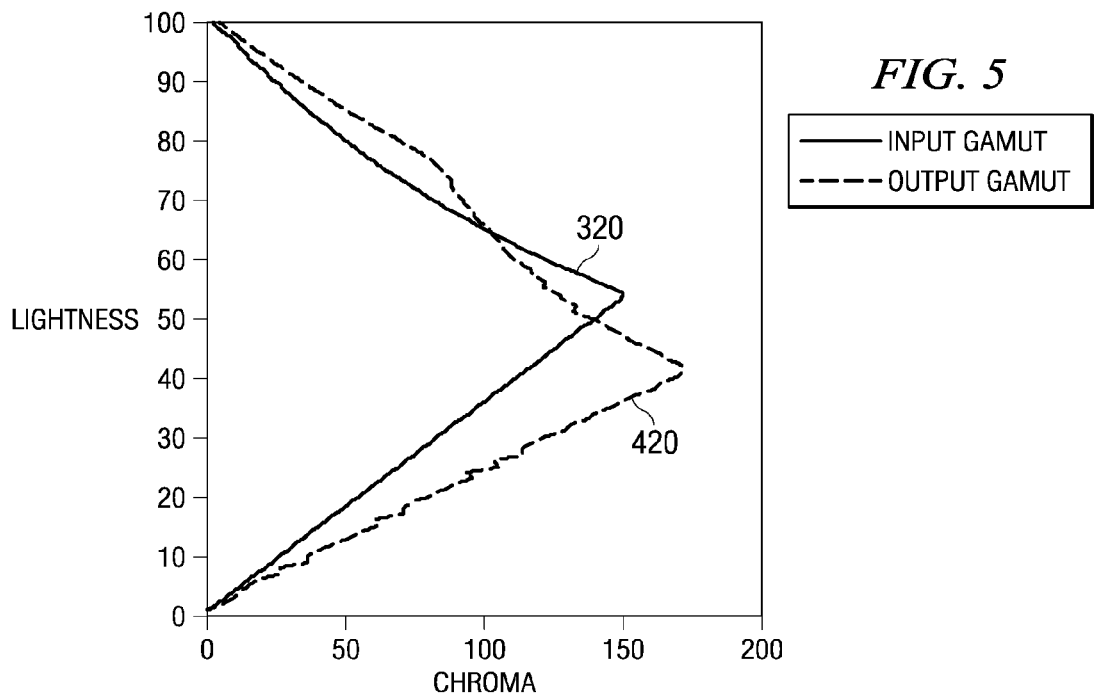
FIG. 5 is a chart of the input and output color gamuts for an exemplary hue slice.

FIG. 5 shows both the input 320 and output 420 hue slices (for a particular, constant exemplary hue angle) in relation to one another, highlighting their differences. Accordingly, it may be useful to map the input color gamut 300 onto the output color gamut 400 in a way that preserves calorimetric accuracy while accounting for the differences in the color gamuts. By performing this type of mapping procedure, transforming the input gamut 300 to the output gamut 400 (for a particular hue slice), for all 360 possible hue slices, the entire input color gamut 300 may be mapped to the output color gamut 400 on a hue-by-hue basis.

Figure 6:
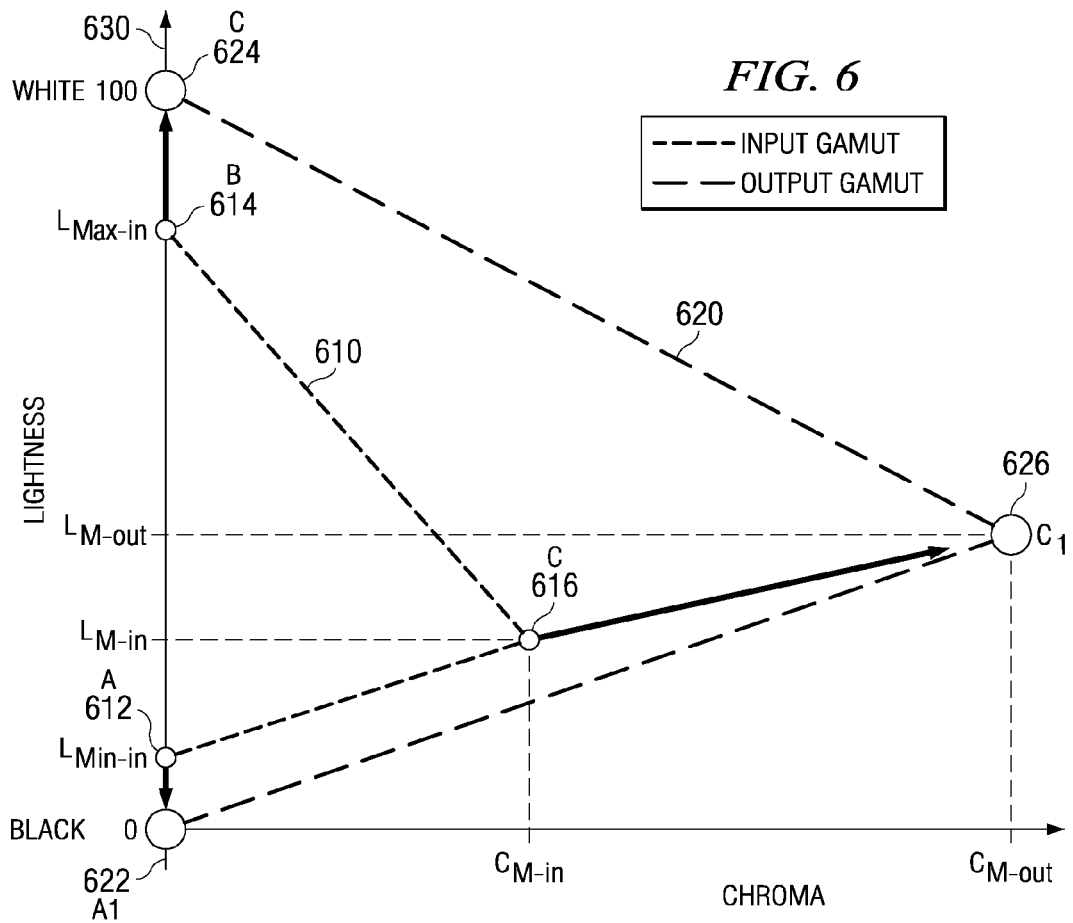
FIG. 6 is a chart illustrating polynomial rubber-sheet mapping of the input gamut to the output gamut for an exemplary hue slice.

Disclosed embodiments teach the use of a polynomial rubber-sheet mapping technique when mapping each of the input hue slice color gamuts to its corresponding output hue slice color gamut. FIG. 6 provides an illustrative example of a basic rubber-sheet mapping technique. Note, these hue slices have been simplified for purposes of this example, and real world hue slices will tend to be more complex than the triangular example described below in conjunction with FIG. 6. (FIGS. 3A, 4A, and 5, along with FIG. 7 discussed in more detail below, illustrate the type of more complex hue slices that may be seen, including possible concavity.) In FIG. 6, the input color gamut 610 of this particular hue slice is smaller than the output color gamut 620. The polynomial rubber-sheet mapping technique essentially acts to stretch the ends of the input color gamut 610 so that they correlate to the ends of the output color gamut 620, with all internal points stretching similarly to follow along behind the extreme points in order to adjust each point in the input color gamut 610 to a corresponding point proportionately within the output color gamut 620.

So in this example, the point of minimum luminance (lightness) 612 of the input gamut 610 is mapped to the point of minimum luminance 622 of the output gamut 620 (which in this example happens to correspond to the zero point, or black), the point of maximum luminance 614 of the input gamut 610 is mapped to the point of maximum luminance 624 of the output gamut 620 (which in this example happens to correspond to a lightness of 100, or pure white), and the point of maximum chroma 616 of the input gamut 610 is mapped to the maximum chroma 626 of the output gamut 620. This mapping of the extreme points of the color gamuts is illustrated by the vectors shown in FIG. 6, which show the manner in which the extreme points of the two color gamuts for a particular hue slice are mapped to correspond. The points internal to the input gamut hue slice 610 will follow along the path set by the extreme points, stretching like a rubber-sheet to proportionately map each point to its corresponding point in the output gamut hue slice 620.

In basic form, a polynomial rubber-sheet mapping technique would be utilized, mapping the points of the input color gamut 610 (for a particular hue slice) to corresponding points within the output color gamut 620 in a way that preserves calorimetric accuracy. So, if the input gamut is larger than the output gamut, points of the input gamut that are outside of the output gamut would be brought inside the range of the output gamut. Points inside both gamuts would be adjusted appropriately, so that color distinctions would remain and critical differentiating information would not be lost. The rubber-sheet mapping technique would adjust all points so that they fit within the output gamut and would be located appropriately in proportion to the extreme points. On the other hand, if the input gamut 610 is smaller than the output gamut 620 (for a particular hue slice, as illustrated in FIG. 6), then the extreme points for the input gamut 610, which serve as control points in this example, would be stretched to the corresponding extreme points for the output gamut 620. Again, the rubber-sheet mapping technique would adjust other points from the input gamut 610, so that they would proportionately map to corresponding points within the output gamut 620.

So the underlying principle of the rubber-sheet mapping technique is that, for a given hue slice, the input gamut 610 is preferentially scaled in or out based on control points. The control points typically determine mapping for the extreme limits of the gamut, and mapping for the remaining points is scaled accordingly to provide for perceptually accurate reproduction. Typically, rubber-sheet mapping scales the input gamut hue slice 610 based on at least three control points. In the example of FIG. 6, the control points for the input gamut 610 are the extreme points of the gamut, A, B, and C (designated reference numbers 612, 614, 616), while the control points for the output gamut 620 are A1, B1, and C1 (designated reference numbers 622, 624, 626). Thus, the point of minimum lightness 612 for the input gamut 610 along the achromatic line 630 (when chroma equals zero), point A, maps to the point of minimum lightness 622 for the output gamut 620 along the achromatic line 630 (corresponding to point (0,0) in this example), point A1; the point of maximum lightness 614 for the input gamut along the achromatic line, point B, maps to the point of maximum lightness 624 for the output gamut along the achromatic line, point B1 (corresponding to point (0, 100) in this example); and the point of maximum chroma 616 for the input gamut, point C of FIG. 6, maps to the point of maximum chroma 626 for the output gamut, point C1.

By choosing these three control points, the achromatic colors would not be unduly distorted during the mapping process, and the chroma of the output may be maximized (to take advantage of the larger output color gamut 620). Depending upon the needs of the system, other control points may be utilized for different effect. By way of example, the point of maximum chroma 616 for the input gamut 610 could be mapped to an arbitrary point in the output gamut 620 (although this might fail to take full advantage of the full scope of the output gamut 620); the midpoint of the input gamut lightness value (along the achromatic line 630) could be mapped to the gray point of the output gamut; or additional control points could be designated in a region of concavity to ensure a good fit. By utilizing additional control points (above the minimum number required to determine the coefficients of the polynomial equations), a better fit may be achieved.

It is often considered desirable to prevent compression of core colors (which are colors around the achromatic axis). By selecting two or more control points along the achromatic axis 630, as is described above, the rubber-sheet mapping technique automatically would reduce the amount of change in chroma/lightness depending upon the distance of a color point from the achromatic axis 630. Points closer to the achromatic axis 630 would tend to experience less change than would points further away from the achromatic axis 630. This control point scaling technique prevents core colors from being corrupted, offering superior calorimetric accuracy.

The rubber-sheet mapping technique may provide a more accurate fit than would a linear mapping technique, because it allows additional control points (above those utilized for linear mapping) to be used during mapping, and accuracy improves as control points are added. A least-squares approach, based on the degree of the polynomial, is used for the rubber-sheet mapping technique. By way of example, rubber-sheet mapping may be accomplished by employing the following set of polynomial equations, which describe the manner in which color points in the input gamut would map to the output gamut:

$$C_o = a_0 + a_1 C_i + a_2 L_i + a_3 C_i L_i$$

$$L_o = b_0 + b_1 C_i + b_2 L_i + b_3 C_i L_i$$

This set of equations represents a first-order rubber-sheet mapping with a cross-term, effectively employing three control points of the type used in the example of FIG. 6. This set of equations would allow any point within the input gamut, with a Chroma $C_i$ and a Lightness $L_i$ to be mapped to a corresponding point within the output gamut, with a Chroma $C_o$ and a Lightness $L_o$. A least squares approach may be used with the control points to compute the "best" set of coefficients ($a_0$, $a_1$, $a_2$, $a_3$, $b_0$, $b_1$, $b_2$, $b_3$) for the set of polynomial equations. And while additional control points may be used in an attempt to achieve a better fit, the user should select at least a number of control points necessary to determine the coefficients for a specific set of polynomial equations (which in the above example, illustrated by FIG. 6, would be three control points). The use of a least-squares approach for determining coefficients would ensure that all control points in the input gamut map to their appropriate corresponding points in the output gamut, while providing a smooth estimate when mapping other points. Once the constant coefficients are determined, a fairly straightforward application of the polynomial equations would allow all of the points in the input gamut 610 for a particular hue slice to be mapped to the appropriate points in the output gamut 620.

It should be noted that in this example, because two of the three control points are defined along the achromatic axis 630, colors closer to the achromatic axis 630 would be less chroma compressed (or expanded) than those further from the achromatic axis (thus preserving core colors). If necessary, additional terms (representing additional control points) may be employed, resulting in higher order polynomial mapping. The higher the order of the polynomial used for rubber-sheet mapping, the more accurate the color mapping may be (since additional control points will better define the parameters for mapping). Typically, the effective limit on the number of terms for the polynomial would depend upon the memory or computing capabilities of the system.

Figure 7:
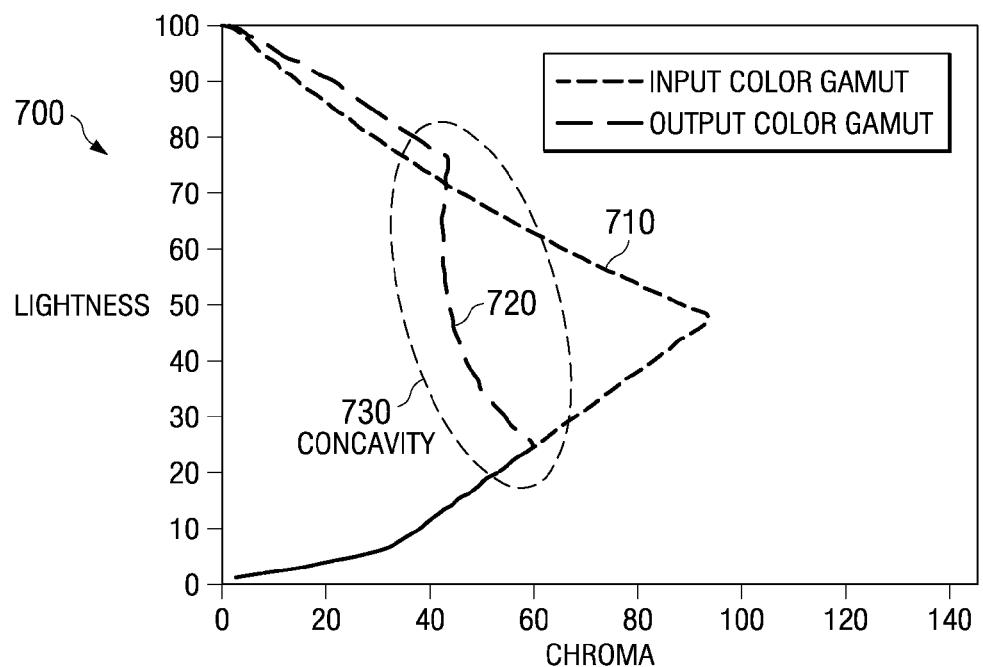
FIG. 7 is a chart illustrating the input and output gamut of an exemplary hue slice in which concavity exists, demonstrating an example of one instance when linear mapping might not produce a particularly effective fit, but when polynomial rubber-sheet mapping may be more effective.

Such polynomial rubber-sheet mapping allows for improved chromatic accuracy. It may be specifically used to preserve achromatic "core" colors, as discussed above by using additional control points along the achromatic axis. This is an advantage that the disclosed embodiments may generally offer over conventional linear mapping techniques. Disclosed polynomial rubber-sheet mapping techniques may also provide for superior mapping of an input gamut hue slice 710 to an output gamut hue slice 720 whenever a gamut includes concavity 730, as illustrated in FIG. 7. Concavities arise typically in multiprimary display systems that contain a red (or cyan) primary that is weaker than the yellow primary (or if the cyan primary is significantly chromatic). Real world display systems may not have color gamuts that produce triangular hue slices (discussed above merely for exemplary purposes). Instead, the hue slices often tend to be more complex figures, perhaps including one or more concavities 730. Linear mapping techniques may have difficulty effectively mapping such irregularly shaped hue slices from the input gamut 710 to the output gamut 720. The added flexibility provided by polynomial rubber-sheet mapping may allow for more effective mapping, however, since additional control points may help define the concavity.

Figure 7A:
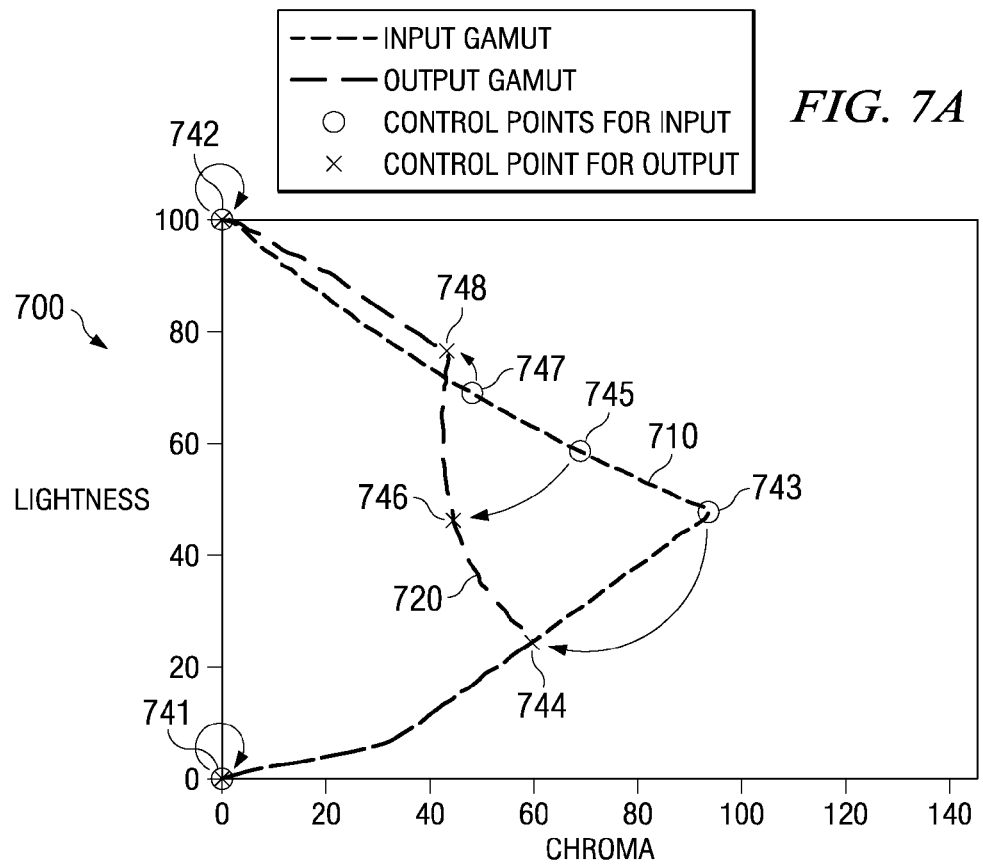
FIG. 7A illustrates an exemplary polynomial rubber sheet mapping technique when there is a concavity, demonstrating the manner in which additional control points may be selected to account for the concavity.

An example of such polynomial rubber sheet mapping involving a concave color gamut may be found in FIG. 7A. In such color gamuts, the disclosed embodiments may account for concavity 730 of the color gamut by specifying control points for the polynomial rubber-sheet mapping to address and preserve the concavity 730 of the color gamut. In FIG. 7A, control points 741 and 742 map back on themselves (since both gamuts have the same beginning and ending points along the achromatic axis). Control point 743, representing the maximum chroma of the input gamut 710, maps to control point 744 for the maximum chroma of the output gamut 720. Two additional control points have been designated within this example in order to account for the concavity of the output gamut 720. Thus, control point 745 in the input gamut 710 maps to control point 746 in the output gamut 720, while control point 747 in the input gamut 710 maps to control point 748 in the output control gamut 720. By defining additional control points to account for concavity, the polynomial rubber-sheet mapping should provide a better fit.

Figure 8:
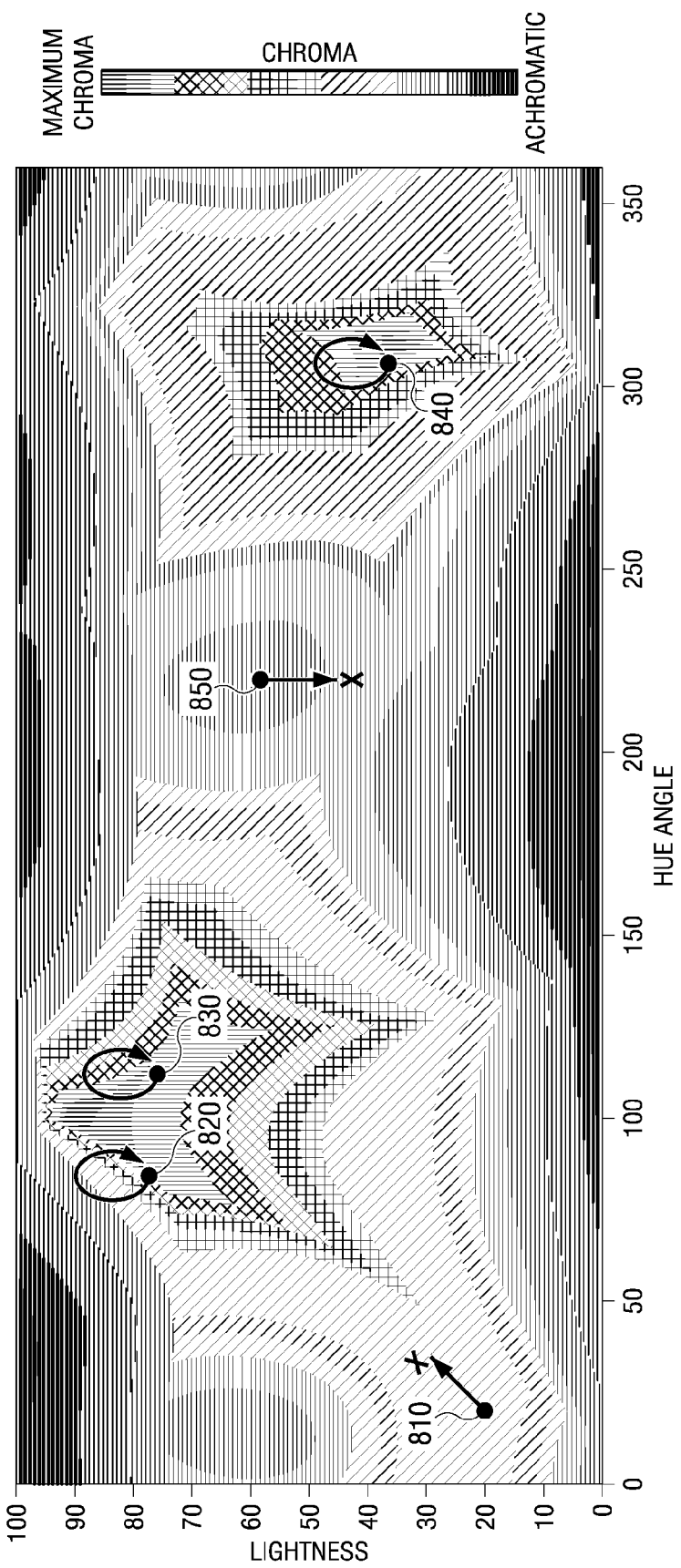
FIG. 8 is a contour elevation map of an exemplary three-dimensional input gamut, providing an illustration of hue-inconstant rubber-sheet mapping, for which several control points would be fixed, while several other control points would be shifted, as for example, if certain hues were to be emphasized.

It should be noted that, while the examples described above all maintain hue, a similar technique would apply if hues were not held constant. Such a technique might be utilized if there is a desire to accentuate certain hues. By way of example, FIG. 8 illustrates an input gamut contour map 800 (representing an entire three-dimensional input gamut of hue, lightness, and chroma) in which certain hues are held constant, while other hues are translated. A 3-D rubber-sheet mapping technique would first be applied to the input gamut 800, using control points to apply polynomial rubber-sheet mapping to the entire 3-D input gamut 800. In FIG. 8, the position of Point 810 would be shifted, changing hue and lightness (and possibly chroma). Points 820, 830, and 840 would be held constant, while point 850 would be shifted (as indicated by the vector arrow). Thus, the 3-D rubber-sheet mapping technique would act to translate points 810 and 850 as prescribed, while holding points 820, 830, and 840 constant. Other points would stretch (translate position) based upon their proximity to the control points. In the example of FIG. 8, the following polynomial equations might be used:

$$L_i' = a_0 + a_1 h_i + a_2 L_i + a_3 h_i L_i$$

$$h_i' = b_0 + b_1 h_i + b_2 L_i + b_3 h_i L_i$$

$$C_i' = f(L_i', h_i')$$

where f(_,_) is a function relating lightness and hue to chroma.

Once 3-D polynomial rubber-sheet mapping has been applied to the entire 3-D input color gamut 800 (maintaining certain points while shifting others), then polynomial rubber-sheet mapping would be applied to each hue slice, as is described above. In other words, hue inconstant mapping is a multi-stage process, first rubber-sheet mapping the entire 3-D input color gamut 800 to account for the desired changes in hue, and then rubber-sheet mapping each of the individual hue slices in order to project the shifted input gamut onto the output gamut on a hue-by-hue basis.

While the examples given above apply a static polynomial rubber-sheet mapping technique for hue-by-hue mapping between color gamuts (in which each hue slice has a set polynomial that may be determined in advance based on the system parameters), a dynamic approach could also be utilized, in which the polynomial equations would be computed as they are needed. Such a dynamic approach might take into account changes to the system over time, allowing for further optimization.

Another complementary system that may be used to improve calorimetric accuracy involves the use of a memory color look-up table. Memory colors are those colors, determined by experience, for which human beings have an innate feel. Any alteration of such a memory color harms the believability of the image being reproduced. Thus, a memory color look-up table may be designed to protect certain memory colors from alteration during any mapping process.

In essence, the memory color look-up table protects memory colors in the input color gamut that are reproducible within the output color gamut, preventing them from being transformed during any rubber-sheet mapping. If a specific color is a memory color (as designated during set up by entry into the memory color look-up table), then the image will be more accurately reproduced to a human viewer's perception if the color remains unaltered when mapping from the input gamut to the output gamut. But transitions between memory colors and other colors that may be shifted during the mapping process should be smoothed, so that there would be no discontinuity that would draw the eye. Accordingly, when using a memory color look-up table in conjunction with a mapping process, colors in the input color gamut are compared to the memory color look-up table to determine the probability that a certain color might be one of the memory colors. The probability that a certain color is one of the memory colors is used to weight or scale the final color (when mapping to the output color gamut), determining the degree of color transformation based on the likelihood of being a memory color.

Thus if the probability (designated p) of a color in the input color gamut being one of the memory colors is high, a new lightness-chroma point (within the output color gamut) would typically be computed using a linearly weighted equation, such as the following: p*(L_memory, C_memory)+(1−p)*(L_new, C_new). In this equation, L_memory, C_memory represent the lightness-chroma value of the memory color point in the input color gamut, while L_new, C_new represent the lightness-chroma value to which the point would be mapped in the output gamut based solely on the mapping technique. Thus, a memory color table provides a simple yet powerful means of maintaining uniformity while not corrupting color reproductions (fixing memory colors while smoothing transitions between memory colors and other colors). And the more memory colors included within the look-up table, the more effectively memory colors can be preserved.

A memory color look-up table may be used with any sort of mapping technique, as it improves the accuracy of any gamut mapping by protecting memory colors. It is particularly effective when used in conjunction with polynomial rubber-sheet mapping, however. By fixing memory colors, the look-up table may improve the calorimetric accuracy without the need for additional polynomial terms. Thus, the memory color look-up table can simplify polynomial rubber-sheet mapping while ensuring effective gamut mapping and preserving selected memory colors. So, while either polynomial rubber-sheet mapping or memory color look-up tables may be used separately, together they complement each other and work together to optimize the calorimetric accuracy of gamut mapping.

Thus, one embodiment of the invention effectively utilizes polynomial rubber-sheet mapping on a hue-by-hue basis in conjunction with a memory color look-up table. Such an embodiment would first determine control points for the polynomial rubber-sheet mapping, determining at least three control points on the input color gamut hue slice and their corresponding locations on the output color gamut hue slice. The number of control points would determine the number of terms within the polynomial, as well as the degree of accuracy that may be achieved. A least squares approach would be used to determine the coefficients for the polynomial. Once the coefficients have been computed, the set of polynomial equations can be used to map each point in the input gamut to the corresponding point in the output gamut. The memory color look-up table would then be applied to determine if any of the colors are memory colors that need to be preserved (rather than being mapped into the output gamut). If memory colors are present (and reproducible within the output color gamut), a weighting system based on the probability that a specific color is indeed a memory color would be applied, scaling color points based on their probability of being a memory color in order to ensure a smooth transition between memory colors (that are not transformed) and other colors (that are transformed via the polynomial rubber-sheet mapping technique). While other embodiments may utilize these or other variants of the rubber-sheet mapping technique and/or the memory color look-up table, individual disclosed embodiments may also use the two techniques in conjunction to improve the image reproduction when mapping from one color gamut to another.

Figure 9:
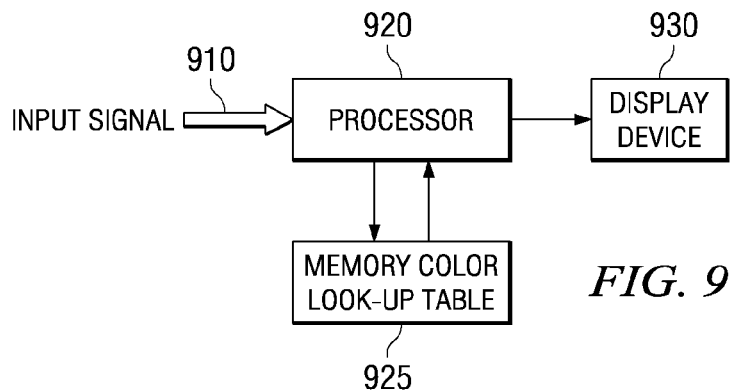
FIG. 9 is a block diagram of a color mapping device in which a processor maps the input color gamut from an input signal to the output color gamut of a display device on a hue-by-hue basis, perhaps also consulting a memory color look-up table to determine if scaling based on the probability of being a memory color should be performed.

Typically, polynomial rubber-sheet mapping techniques would operate via a computer processor 920, mapping color points (representing chroma and lightness for a given hue slice) from an input signal 910 with an input color gamut to a display device 930 with an output color gamut. The set of polynomial equations associated with each hue slice would determine the manner in which the processor would map color points from the input gamut to the output gamut. Likewise, the processor 920 might interface with a memory color look-up table 925, comparing color points in the input gamut to the entries of the memory color look-up table 925 to determine the probability of a color being a memory color. The processor 920 would then scale any transformation of color points in the input color gamut via a mapping technique, such as polynomial rubber-sheet mapping, based on the probability. Thus, the input signal 910 would be operated upon by the processor 920, mapping the input color gamut of the input signal 910 to the output color gamut of the display device 930 using a polynomial rubber-sheet mapping technique. The processor 920 may also check colors against the memory color look-up table 925 and scale color transformation based upon the probability of being a memory color. Once the processor 920 has mapped the input color gamut to the output color gamut (including any memory color preservation), the color data would be communicated to the display device 930 (or possibly to a storage device for later display). The term "display device" is used broadly, and generally describes any type of device for displaying visual images (or storing visual images for later display), typically (by way of non-exclusive example) by combining different colors of light from reflective, transmissive, and/or emissive sources, and also includes display panels and storage devices. FIG. 9 generally illustrates such a color mapping device.

Figure 9A:
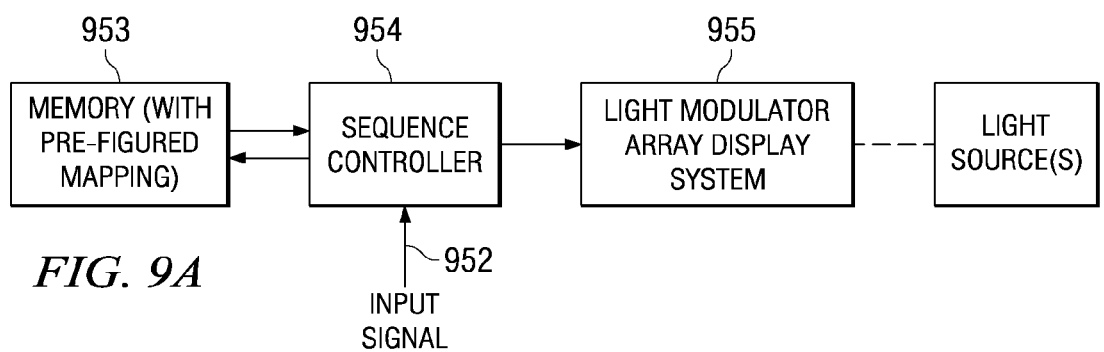
FIG. 9A is a block diagram of a specific color gamut mapping device for a light modulator array, such as a DMD.

FIG. 9A provides a more specific example of a device configured to use the above-described techniques for color mapping within a Light Modulator Array display system 955 (wherein the display device 930 would use an array of light modulators). Examples of light modulator arrays include a Digital Micromirror Device, a Liquid Crystal Display, a liquid crystal on silicon array, a plasma display, a Cathode Ray Tube (CRT) display, a Silicon X-tal Reflective Display (SXRD), and deformable mirror arrays. At the heart of the display system 955 in this specific example is a light modulator array, such as a DMD with an array of small micromirrors that works in conjunction with one or more light sources, and in some instance a color wheel, to project visual images. (Rather than using a single light source and a color wheel, a DMD might by way of example use multiple light sources of differing color.) A sequence controller 954 generally controls the light modulator array 955 to reproduce images from the input signal 952 within the output gamut. In the example of a DMD device, the sequence controller 954 (which might be an Application Specific Integrated Circuit (ASIC)) would rapidly tilt the micromirrors between on and off positions in order to recreate the frame image.

Gamut mapping generally is based on known system parameters, allowing the gamut mapping algorithm to be performed and stored preliminarily (before transmission of the image input signal 952 begins). Thus, the image input video signal 952 would enter the sequence controller 954, which would map the input gamut to the output gamut by using the pre-stored mapping algorithm (stored in memory 953). In other words, for any color X in the input color gamut, the sequence controller 954 would consult its pre-stored conversion data (using the previously performed polynomial rubber-sheet mapping process results stored in memory 953) in order to map to a specific color Y in the output color gamut. The sequence controller may also consult a memory color look-up table, stored in memory 953, in order to determine if any color mapping needs to be scaled to preserve memory colors. The sequence controller 954 would then control the light modulator array 955 to reproduce the image from the input signal 952 within the output color gamut. By way of example, in a DMD system the ASIC would control image reproduction by flipping the micromirrors of the DMD on and off in rapid succession with respect to the light source(s) (and possibly a color wheel).

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of the Invention," the claims should not be limited by the language chosen under this heading to describe the so-called field. Further, a description of a technology in the "Background of the Invention" is not to be construed as an admission that certain technology is prior art to any invention(s) in this disclosure. Neither is the "Brief Summary of the Invention" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What we claim is:

1. A device comprising:
   an input signal with an input color gamut within a three-dimensional perceptual color space;
   a display device with an output color gamut within the three-dimensional perceptual color space; and
   a processor linking the input signal to the display device via electrical communication, operable to map colors on a hue-by-hue basis from a hue slice in the input color gamut to a hue slice in the output color gamut using a polynomial rubber-sheet mapping technique;
   wherein the three-dimensional perceptual color space represents colors in terms of hue, lightness, and chroma;
   at least three control points are selected in each color gamut hue slice, wherein each control point in the input color gamut hue slice maps to its corresponding control point in the output color gamut hue slice; and
   coefficients for the polynomial rubber-sheet mapping technique are computed based on the control points using a least-squares technique;
   a memory color look-up table in electrical communication with the processor, wherein colors in the input color gamut are compared to the memory color look-up table to determine the probability of being a memory color, and the amount of transformation when mapping colors from the input color gamut hue slice to the output color gamut hue slice is scaled according to the probability of being a memory color.

2. A device as in claim 1, wherein:
   one control point for the input color gamut hue slice is set as the point of maximum chroma in the input color gamut hue slice, which maps to the point of maximum chroma in the output color gamut hue slice;
   one control point for the input color gamut hue slice is set as the point of maximum lightness in the input color gamut hue slice, which maps to the point of maximum lightness in the output color gamut hue slice; and
   one control point for the input color gamut hue slice is set as the point of minimum lightness in the input color gamut hue slice, which maps to the point of minimum lightness in the output color gamut hue slice.

3. A device as in claim 1 wherein the polynomial used for the rubber-sheet mapping technique is at least of first order with a cross term.

4. A device as in claim 1, wherein:
   the display device comprises a light modulator array;
   the processor comprises a sequence controller; and
   the sequence controller controls the light modulator array to reproduce images from the input signal within the output color gamut.

5. A device as in claim 4, wherein the light modulator array comprises a Digital Micromirror Device.

6. A device as in claim 4, wherein the light modulator array is selected from a group consisting of a Digital Micromirror Device, a Liquid Crystal Display, a liquid crystal on silicon array, a plasma display, a CRT display, an SXRD, and deformable mirror arrays.

7. A device as in claim 4, wherein the polynomial used for the rubber-sheet mapping technique is at least of first order with a cross term.

8. A device as in claim 7, wherein:
   one control point for the input color gamut hue slice is set as the point of maximum chroma in the input color gamut hue slice, which maps to the point of maximum chroma in the output color gamut hue slice;
   one control point for the input color gamut hue slice is set as the point of maximum lightness in the input color gamut hue slice, which maps to the point of maximum lightness in the output color gamut hue slice; and
one control point for the input color gamut hue slice is set as the point of minimum lightness in the input color gamut hue slice, which maps to the point of minimum lightness in the output color gamut hue slice.

* * * * *